March 15, 1949.  R. J. S. CARTER ET AL  2,464,212
MILLING PROCESS FOR GRANULAR FOOD CROP PRODUCTS,
INCLUDING FLING IMPACTING IN BREAKING AND
FINISHING OPERATIONS
Filed Feb. 10, 1944  3 Sheets-Sheet 1
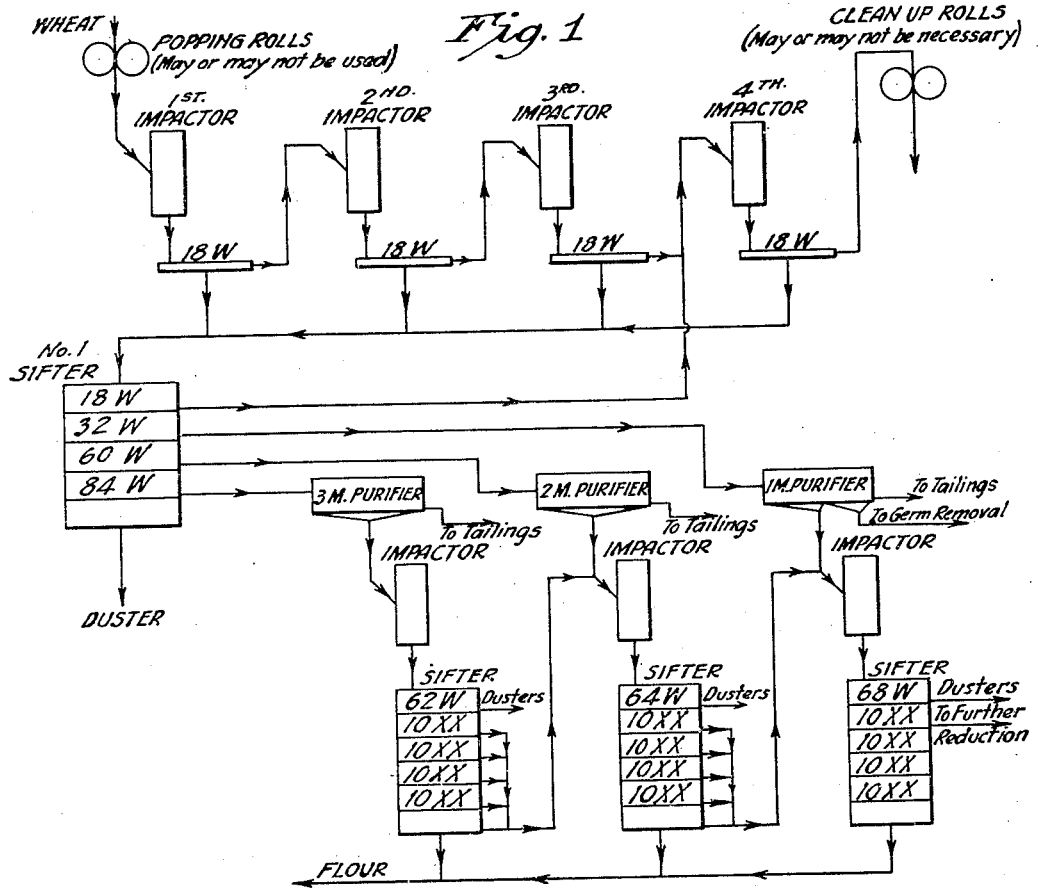
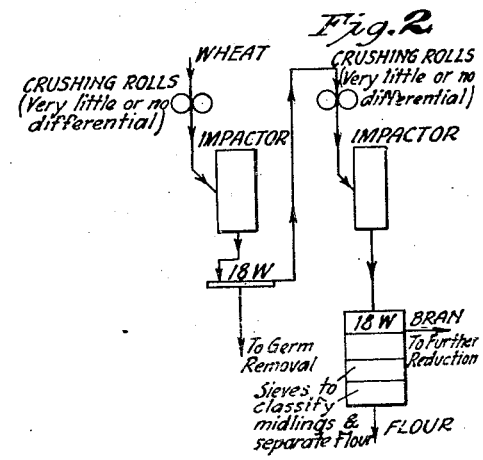

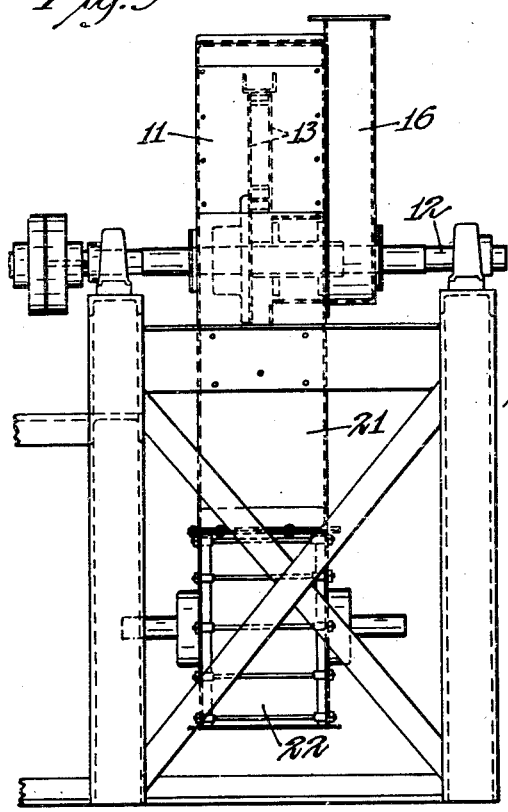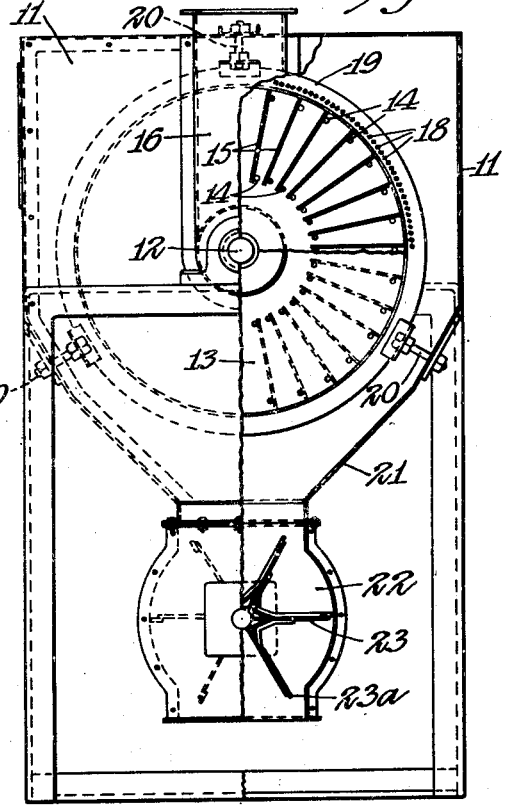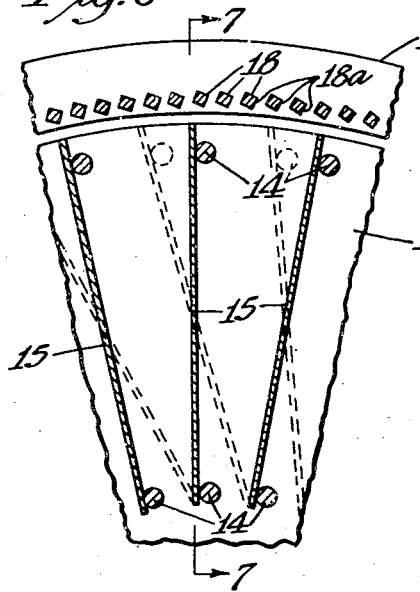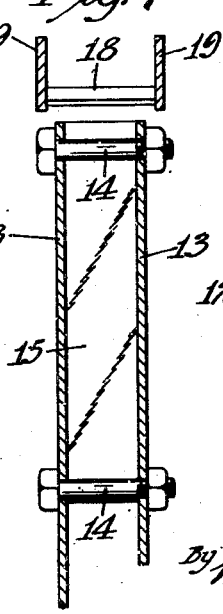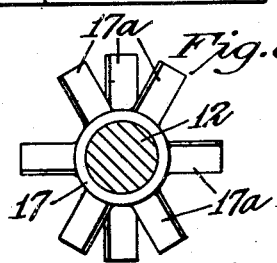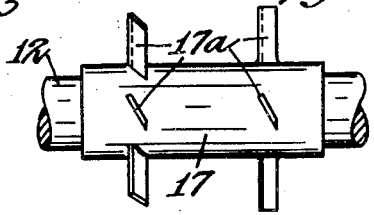

Patented Mar. 15, 1949

2,464,212

UNITED STATES PATENT OFFICE 2,464,212

MILLING PROCESS FOR GRANULAR FOOD CROP PRODUCTS, INCLUDING FLING IMPACTING IN BREAKING AND FINISHING OPERATIONS

Robert J. S. Carter and Hugh McDonald, Minneapolis, Minn., assignors to Pillsbury Mills, Inc., a corporation of Delaware Application February 10, 1944, Serial No. 521,784

7 Claims. (Cl. 241—7)

This invention relates to processes for milling flour and also less comminuted material from granular food crop products, particularly from grains, such as wheat, rye and corn.

In the milling of flour and other less comminuted products, it is the present practice to grind, crush and disintegrate the grain by passing the stock through a succession of oppositely rotating rolls or roller mills, wherein one roll has a greater speed than the other, which is referred to as the differential. The rolls at the head end of the mill are called the break rolls and have corrugated surfaces and comprise about 40% of the total number of rolls in the mill. The finishing rolls, also revolved at differential speeds, are provided with smooth or finely corrugated surfaces and are usually referred to as finishing rolls and are primarily used to reduce middlings or grits and comprise about 60% of the total number of rolls in a flour mill.

The disintegration and reduction of the stock fed to the respective roller mills is controlled by the pressure and shearing action on the grain passing between the two oppositely revolving rolls driven at a differential speed. Setting of the spaced relation of the two cooperating rolls of each set for variance in the stock fed and for variance in reduction desired depends upon the personal element of the operator and thus inaccuracy and inefficiency often occurs. Furthermore, the grain stock being of varied size, some of the smaller sized material passes between the rolls and grinds to a lesser degree than desired, while on the other hand many of the smaller granules compacted by larger stock interspersed therewith are ground to a greater degree than desired for the setting of a particular roller mill. As a consequence, in any roller mill operation throughout the milling of flour, and this applies both to the breaking rolls, as well as the finishing rolls, a great variety of sizes of particles are produced and only a relatively small percentage of the particles processed by any set of rolls are of a particular range of size. Because of this situation many subsequent and interposed sifting, classification and purifying steps are required throughout the mills between the sets of rolls for proper separation of particles and for further reduction.

Furthermore, the crushing action which is necessarily present in such roller mills, with the attendant tearing or shearing action produced through differential speeds, causes any oily ingredients from such parts as the germ to be mixed with ingredients such as the endosperm and also tends to prevent parts such as the hull, germ and the more friable endosperm particles from separating or cleaving apart during such roller action.

The installation cost and subsequent maintenance of the very heavy and expensive roller mechanism is high and the amount of building space, as well as heavy supports for mounting of such machinery is large and expensive. The power required to operate many units of both "breaking" and finishing rolls is very substantial. Furthermore, in reduction of grits or middling stocks from roller mills, there is a considerable moisture loss because of the roller or crushing action in each successive reduction.

The efficiency of such roller mills in sub-dividing the stock in reduction of middlings is comparatively low. For example, the average amount of flour obtained in the successive middling reduction steps, wherein on the average, one or more stands of large rolls are utilized with the associated sifting mechanism averages only from 10% to 45% of the middling stock treated depending on the nature of stock and proper adjustment of the rolls. Because of said relatively low efficiency, a large percentage of the middling stock has to be successively treated and re-handled requiring many middling reduction roller units as well as the associated sifters, purifiers and other apparatus with the attendant installation cost, maintenance and housing facilities.

It is an object of our present invention to provide a simplified and highly efficient process for the milling of granular food crop products, such as wheat, rye and corn, which through a sequence or combination of high velocity, fling-impact steps, disintegrates and reduces the granular stock to particles conforming to a materially less number of sizes or classifications with greater uniformity for the several classifications as contrasted with roller mill operations; which effects a faster and more efficient breaking away and separation of endosperm, hull and germ parts and which with materially increased efficiency reduces middling or grit stocks to comminuted form or flour.

More specifically it is an object to provide a combination of method steps which dispense with roller mill and grinding principles, both in the breaking and finishing operations of flour mills and the like, wherein successive disintegration and reduction of the granular stock is accompanied with the production of a substantially greater portion of endosperm particles within a predetermined range of classification, thereby requiring throughout the mill much less re-handling and fewer classification, purification and reduction steps to produce flour and other comminuted products of high quality.

A further object is the substitution as far as possible, throughout the entire process of milling, of highly efficient fling-impact operations for the presently used roller mill units to effect a very material economy on the installation cost, maintenance and power required for the expensive, bulky and unnecessarily multiplied machinery and apparatus at present employed for carrying out the roller mill operations.

Some impacting operations and apparatus have been heretofore utilized for certain specific purposes in milling operations, such as in breaking away the germ portions of the grain from the endosperm; in recovery of endosperm particles from adhering hull portions and also in conjunction with beater operations for killing infestation in grains. The use of impacting apparatus and operations for loosening and freeing the germ of grain from the more friable endosperm at the head of a mill is disclosed in U. S. Letters Patent 2,392,365 granted to Pillsbury Mills, Inc., as assignee of Robert J. S. Carter, one of the applicants herein.

We have discovered, that if certain types of grain and other food crop granules are flung at high velocity against hard impaction surfaces, that not only is separation of the more elastic germ and hull portions of the granular crops accomplished, but in addition throughout a combination or succession of such particular impacting steps, properly carried out, there is produced a much greater percentage of comparatively pure endosperm particles of more uniform classification and shape with more uniform reduction in each successive disintegration step, through such impaction operation than has been produced from commercial roller mill or other grinding operations extensively utilized heretofore.

We have further discovered that by the use of certain impacting steps at least in several parts of the milling process, much economy can be obtained in installation cost, maintenance and power with a much higher efficiency in production and with the production of substantially purer middlings or grits and consequently finer, more uniform and purer flour and other comminuted material.

To obtain successful results for breaking away, disintegrating and reducing the valuable endosperm portions of granular food crops, we have found that a true centrifugal flinging of the particles by centrifugal impellers, or the equivalent, using more or less radially disposed fling arms is essential as contrasted with operations wherein apparatus having primarily beater functions and elements with some attendant centrifugal action due to friction of the particles on a rotating plate, are utilized.

The speeds of revolution of the particular centrifugal impellers, as related to the condition, classification range and type of granular stock treated in the respective steps, is an important and usually critical factor; as is the arrangement of and spacing of circumferential impacting areas relative to the periphery of the impeller. The general rule relating to speed of the centrifugal impellers is that higher speeds and consequently higher fling velocities must be utilized for disintegrating and reducing progressively smaller granules to obtain successful results in production of endosperm particles by our method, both in the "breaking" steps and subsequent finishing or reducing steps.

The objects and advantages of our invention will more fully appear from the following description made in conjunction with the accompanying drawings, wherein—

Figure 1 is a diagrammatic flow sheet for the main portions of a simplified flour mill wherein the processes of our invention are employed, and wherein crushing rolls and roller mill operations have been entirely eliminated both in the breaking steps and in the middling reduction steps or finishing operations;

Figure 2 is a diagrammatic flow sheet illustrating typical steps of a variation of our novel process wherein impacting operations are combined with light crushing roller operations;

Figure 4 is a view in rear side elevation of a preferred type of impacting machine which may be employed in connection with certain steps of our processes, a portion of the rear casing of said impactor being broken away to show working parts in full and therewithin;

Figure 5 is an end elevation of the same;

Figure 6 is a fragmentary side elevation showing the relationship of the radial fling arms and circumferentially spaced impaction areas of the device;

Figure 7 is a vertical section taken on the line 7—7 of Figure 6;

Figure 8 is a detailed end elevation of a feeding and distribution element for the impactor, detached; and Figure 9 is a side elevation of the same.

Figure 3:
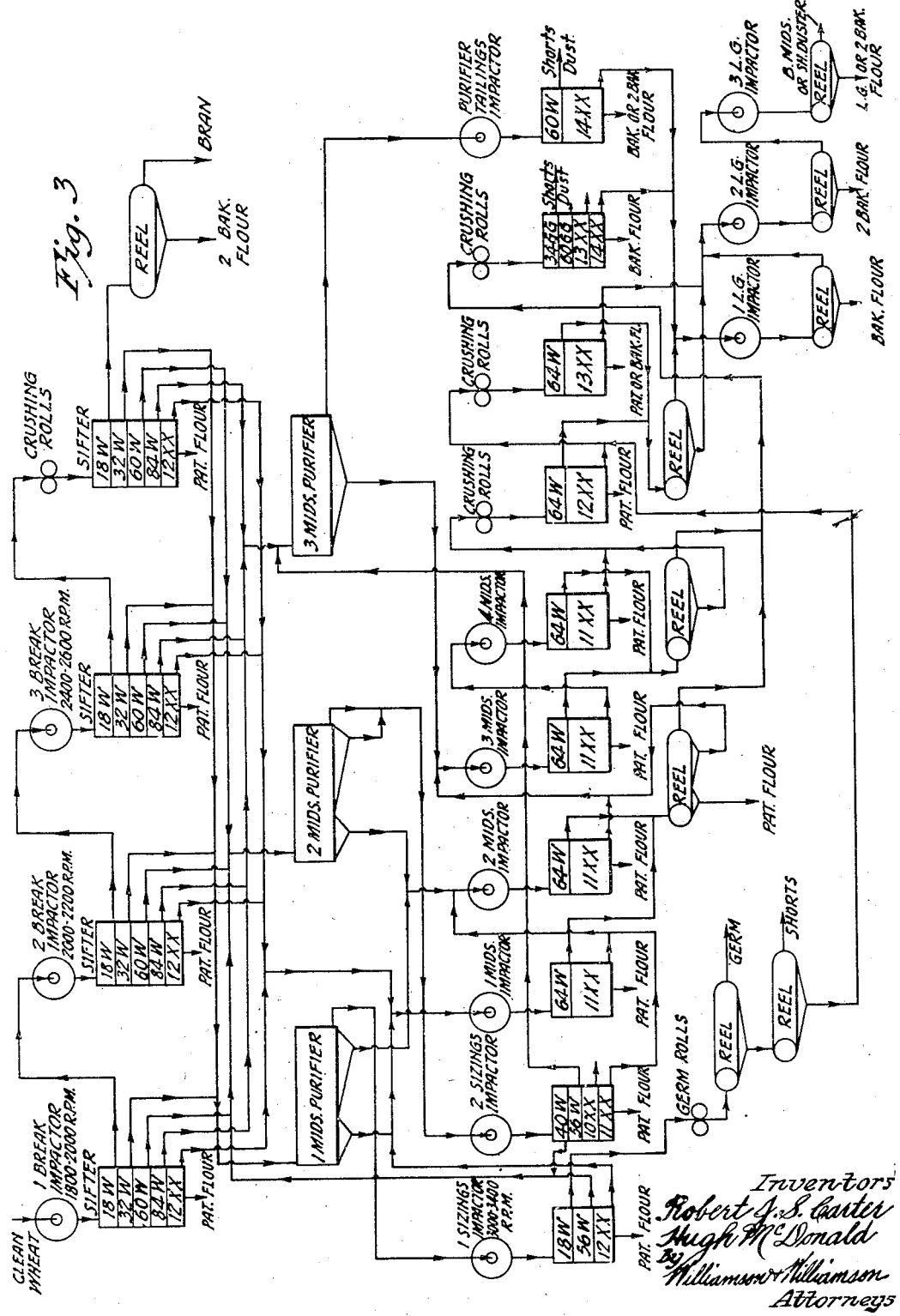
Figure 3 is a diagrammatic flow sheet of a wheat flour mill wherein the processes of our invention are employed throughout a number or combination of the several breaking and reduction steps, with however the interspersion of crushing rolls in both main parts of the milling, but with however the attainment of important improved results and efficiency through the use of our processes.

We now refer to Figure 1 of the drawings showing a wheat milling process wherein the usual roller mill operations have been entirely eliminated both in the breaking steps and in middling reduction steps by the use of our process.

As shown in this flow sheet, Figure 1, at the head end of the mill and before the wheat berries have been broken or divided in any manner, the clean and conditioned wheat berries may be lightly cracked by passing the same between a pair of oppositely revolving smooth-faced "popping" rolls having no differential speed. These rolls are spaced apart a slightly greater distance than the corrugated rolls used as the first break rolls in a conventional flour mill and in the drawings are shown at the upper left hand corner of the sheet. It is to be understood that these "popping" or light cracking rolls may or may not be used all within the scope of our invention. It is very important that no grinding or tearing action be obtained as the granular material passes between the "popping" rolls. The rolls when used act lightly on the berries producing mainly cleavage cracks without causing to any appreciable extent a separation between the particles of the berries while retaining the individual berries in unitary form.

Proceeding further with our processes and considering that the introduced wheat has been cracked, the same passes to a high speed centrifugal, fling-type impactor which may be of the type shown in detail in Figures 4 to 9 of the drawings but is preferably of the type disclosed in U. S. Letters Patent 2,378,393 of June 19, 1945 issued to Pillsbury Mills, Inc., as assignee of one of the applicants, to-wit, Robert J. S. Carter, title "Impacting machine." If the cracking step is not utilized the clean and conditioned granular material in whole form is carried directly to the first impactor at the head end of the mill. In the impactor the berries are violently thrown at high speed through the medium of more or less radially disposed fling arms against an annular impactor wall or ring, preferably having impact areas disposed perpendicularly to the fling travel of the granules, thereby causing the friable endosperm portions to be shattered and broken apart from the more elastic germ and bran portions while the germ and bran or hulls in more or less whole form are broken away from the endosperm portions without being broken up to any appreciable extent. The endosperm particles or middlings produced through the above recited shattering action are substantially more uniform and of less variety in classification ranges than those produced by any of the conventional grinding methods utilizing roller mills or mill stones and consequently they may be more easily and economically rehandled, classified and reduced in the subsequent steps.

The first "breaking" impactor discharges upon a screen, as shown, of 18 mesh wire and the "overs" from said screen which include mostly hull portions to which adhere endosperm particles, are carried to the second impactor. The "throughs" from the 18 W. screen together with "throughs" from similar 18 W. screens at the discharge ends of the other "breaking" impactors are carried to the No. 1 sifter shown in Figure 1 and this sifter is preferably provided with a number of screens of increasingly finer mesh, for example and as shown, the upper screen being of 18 W. mesh, the next lower screen of 32 wire mesh, the next lower screen being of 60 mesh and the next or as shown lowermost screen being of 84 mesh. If desired additional lower screens may be provided of still finer mesh or if desired of bolting cloth.

The relatively few "overs" from the 18 mesh screen of the No. 1 sifter (mainly unbroken, heavy hull portions with endosperm attached) are carried, as indicated by the arrowed line to a "breaking" impactor designated "4th Impactor" and there they are impacted at higher speed than the velocity obtained in the first impactor.

It will be understood that the 18 W. screen may be eliminated in the No. 1 sifter if desired in which case, of course, no material is conducted from the No. 1 sifter to the 4th impactor. The discharge of the 4th impactor is upon an 18 wire mesh screen and the "overs" from this screen may be fed to clean-up rolls and other apparatus not shown. The "throughs" from the last mentioned 18 mesh screen are carried with the "throughs" from other similar screens, related with other impactors in the breaking steps, to the No. 1 sifter as shown in the flow sheet.

Referring back to the second impactor which receives the "overs" from the first 18 mesh screen, it will be understood that these "overs" consisting mostly in bran or hull portions having adhered thereto small particles of endosperm and in more or less unbroken form are violently projected against the impact surfaces, disintegrating the friable endosperm and breaking the same away from the elastic hull portions and simultaneously sub-dividing or reducing particles of the endosperm. The No. 2 impactor discharges upon an 18 mesh screen and the "overs" therefrom consisting mostly in light hull portions with some small particles of endosperm adhering pass to the third impactor where the impacting action is repeated and substantially all endosperm particles are broken away and to a considerable extent sub-divided and the more elastic hull or bran portions are removed by a screen preferably of 18 mesh, upon which the third impactor discharges, the "overs" passing to the fourth impactor.

As, has been stated, the "throughs" from the several 18 mesh screens associated with the discharges of the four impactors are all carried and delivered to the No. 1 sifter and contain some small amounts of flour, a large amount of middlings and most of the germ. Substantially all of this germ is removed in the No. 1 sifter by the top 32 mesh screen and is carried with other stock to the first middling purifier designated "1 M" purifier where the germ is separated from the larger middlings and the bran and germ are thereafter further classified, treated and collected (not shown in detail).

The four impactors described and which are utilized in the breaking steps of our process, are preferably revolved at progressively inceasing speeds. Thus the first impactor if of either of the constructions referred to herein, is revolved in a range between 1800 and 2000 R. P. M.; the second impactor is revolved in a speed range between 2000 and 2200 R. P. M.; the third impactor between 2400 and 2600 R. P. M. and the fourth impactor in a range between 2700 and 3000 R. P. M. The point is that each of these successive impactors operates upon granular material having an average size somewhat smaller than the material of stock fed to the preceding impactor in series and it has been found that greater efficiency, in disintegration and reduction of endosperm particles, as well as in cleavage of endosperm particles from bran or germ is obtained when the impactor speeds are increased in accordance with the decrease in general size and weight of the granular stock fed.

The second or 60 mesh screen of No. 1 sifter separates the larger middlings from the smaller middlings and the "overs" from this screen are carried, as indicated by the arrowed line, to the second middling purifier. The "throughs" or small middlings which pass through the 60 mesh screen drop to the third or as shown 84 mesh screen and the "overs" from that screen are carried to the third middling purifier. The "throughs" from the 84 mesh screen, as shown, are carried to dusting apparatus (not shown) for recovery of flour. The three middling purifiers deliver to the respective middling impactors, as indicated in the flow sheet, these middlings impactors being preferably constructed in accordance with the impactor devices illustrated in Figures 4 to 9 of the drawings, utilizing circumferentially spaced impaction bars or elements with their respective impact surfaces disposed preferably perpendicularly to the fling travel of the particles forcibly projected thereagainst.

The several middling impactors are preferably revolved at higher speed than the impactors used in the "breaking" steps previously described, being usually driven within a range between 3000 and 3600 R. P. M. In the middling impactors the middling particles are violently projected at high speed against the hard impact surfaces, shattering and sub-dividing into particles wherein a comparatively small range of sizes are produced as contrasted with the particles produced from conventional roller mill grinding. Each of the three middling impactors illustrated on the flow sheet, Figure 1, delivers to a sifter and, as shown each middling sifter is provided with a top screen of 62, 64 or 68 mesh and with a series of several bolting cloths, as shown, of 10XX mesh. The "overs" from the respective top screens of 62 W. mesh, 64 W. mesh, or 68 W. mesh, of the middlings sifters are carried to dusters and other apparatus as indicated (not shown on the flow sheet). The fine particles of flour which passes through the series of several 10XX bolting cloths from all of the middling sifters is carried off as shown. The "overs" from the several bolting cloths of the sifter for the third middlings purifier are carried to the second middlings impactor and the "overs" from the bolting cloths of the sifter for the second middling impactor are carried to the impactor for the first middlings.

The proportions of flour and comparatively pure middlings produced in the successive breaking steps of our process are materially higher than are obtained through any of the conventional roller mill operations known to applicants. Consequently in utilizing our process fewer breaking operations are required with, of course, the elimination of several sifting, re-handling and purifying operations now required with the usual roller mill process.

A very high efficiency is obtained by our process in the reduction of the middlings due to the more uniform sub-division of the middling stock, through the high velocity impaction operations. In fact in tests which we have made to determine the efficiency of the reduction steps of our method, we have been able to average in several successive runs the production of 88% flour from middling stock treated in a single middling reduction impactor unit.

In Figure 2, a variation of our process all within the scope of our invention, is illustrated as applicable both to the breaking steps and to middling reduction. In Figure 2, a combination of crushing rolls with high velocity fling-impaction steps is shown. The stock is fed between a pair of high speed crushing rolls driven at substantially similar speed or with very little, if any differential, and spaced apart a slightly greater distance than the conventional spacing utilized in roller mill grinding operations. After passing through such a crushing operation which fractures but does not materially shatter or separate the endosperm particles, the stock enters a high speed fling-type impactor where the previously fractured endosperm is shattered, divided and broken away from the bran and germ portions which are more elastic. The "overs" from the relatively coarse screen after discharge from the first impactor are fed between a second pair of smooth-faced or finely corrugated crushing rolls driven at substantially similar speeds and having approximately the same functions as the rolls previously described. The entire stock crushed by the second set of rolls without being screened is delivered to a second impacting machine, as shown.

We contemplate the use of such combinations of crushing rolls interspersed between fling-type impactors both in the breaking and finishing operations of our process.

In Figure 3 a somewhat more elaborate flow sheet of a small capacity wheat flour mill is diagrammed wherein a combination of impacting and roller mill crushing operations are utilized both in the breaking steps and in the subsequent reduction of middlings. Here it will be noted that the cleaned and conditioned wheat at the head end of the mill is successively treated by three break impactors and the hulls and other large particles separated off from the discharge of the third impactor with some small fragments of endosperm adhering are then ground between a pair of conventional type crushing rolls operated here at differential speeds. In certain installations it may be desirable to substitute only a few impacting operations for some of the conventionally used and previously installed roller mill operations. For example, a mill equipped for five or six successive crushing operations by roller mills could probably obtain better efficiency by the substitution of two fling impacting steps and one or two roller mills steps utilizing two of the roller mills already installed. Likewise, in the reduction of middlings a fewer number of reduction or disintegration steps may be utilized with materially increased efficiency in the production of fine and purer flour by installing or substituting for example three or four impacting machines of the high velocity fling-type for five or six of the smooth-faced, differential speed crushing rolls and still utilizing two or three of the available differential speed crushing rolls.

In view of the detailed description of Figure 1 and the conventional showing of the various pieces of apparatus in flour mill flow sheets, no detailed description of Figure 3 is thought necessary beyond what has been here given.

In Figures 5 to 9 inclusive, we have illustrated an improved and highly efficient impacting machine well adapted for use in all of the impacting steps of our process and peculiarly adapted for the finishing or reduction steps. As illustrated, this impacting machine is housed in a vertical box-like casing 11 of rather narrow breadth and having mounted in the upper portion thereof, on a horizontal shaft 12, a fling-impeller in the form of two spaced discs 13 between which are secured, as by transverse pins or bolts 14, a series of more or less radially extending fling arms 15. As shown, said fling arms are in the form of smooth-flat plates and extend for about one-half of the radius of the disc to the periphery of the impeller. Granular stock to be impacted is fed into the center of the impeller through an upright chute 16 which communicates at its lower end with a suitable aperture formed in casing 11. A stationary horizontal distribution sleeve 17 is secured to one side of casing 11 extending through an aperture in one of the discs 13 to direct material to the center of the space between said discs.

To effect a comparatively uniform distribution of the granular material between the multiplicity of substantially radial fling-arms, we provide on a driven shaft 12, two or more series of twisted distribution blades 17a (see Figures 8 and 9) which may be integrally formed or otherwise rigidly secured to a sleeve or collar 17 fixed to the medial portion of shaft 12. The two series of distributor blades 17a are relatively staggered and the blades are twisted or canted to progress the material fed inwardly to the impeller, taking into consideration, of course, the direction of revolution of the shaft 12.

Instead of an unbroken or serrated impaction ring, as is disclosed in the application of the applicant, Robert J. S. Carter herein previously referred to, we provide a multiplicity of spaced, circumferentially arranged impaction bars or elements mounted outwardly a short distance beyond the periphery of the impeller. Each of the multiplicity of impaction bars 18 as illustrated, is set more or less edgewise to radii of the impeller wheel and has its impaction surface, indicated at 18a, see Figure 6, disposed substantially perpendicularly to the fling lines of the granular material centrifugally thrown by the high velocity impeller. With impellers of the type described driven within a range between 2800 and 3400 R. P. M.'s, the angulation of the several impact bars to the radii intersecting the closest edge of the respective bars, should be about 20°, for highest efficiency. It will, of course, be understood that for various types of granulated stock and for various speeds of the impellers this angulation will be somewhat varied. The multiplicity of circumferentially spaced impact bars 18 in the form of the machine shown have their ends secured between a pair of mounting rings 19 which are clamped or otherwise secured for oscillatory shifting, to the casing 11 by suitable means, such as the bolt clamps 20.

Within the casing 11, below the impeller and impaction elements, a hopper 21 is provided extending between the two side walls of the casing and centrally communicating at its bottom with an air lock chamber 22 which has mounted therein a rotating paddle wheel 23 synchronized properly with the driving of shaft 12 to obtain a desired air lock relation with the sub-divided material which is discharged between the impact bars 18 and drops downwardly by gravity. Each of the blades of the paddle wheel 23 is preferably provided at its outer end with a flexible wiper strip 23a which is adapted to engage and seal by wiping action with segment cylindrical surfaces of the air lock chamber 22.

In the operation of our improved impacting machine the granular material is fed axially of the impeller and distributed quite uniformly by the high speed revolution of the radial distributor blades 17a to the very center of the impeller between the two discs 13. The distribution sleeve 17 confines the material being introduced and cooperates with the revolving distribution blades. The granular material is thus distributed within the impeller to the inner ends of the multiplicity of compartments defined by the more or less radially disposed fling plates 15 and thereafter is moved violently outward through centrifugal force and the action of the fling plates or arms being projected from the impeller along lines deviating to some degree from the tangents at the respective points where the particles leave the fling arms. The deviation at the speeds indicated herein amounts to somewhere in the neighborhood of 20° and consequently the hard planular impact surfaces of the circumferentially spaced impaction bars are preferably disposed at about 20° angulation to radii of the impeller so that they will be opposed substantially perpendicular to the movement of the flung particles. The particles tend to move in their fling travel longitudinally and strike the respective bars and are shattered sub-dividing and passing outwardly between the spaced bars, whereafter they drop by gravity into the hopper 21 and fall into the air lock chamber upon the rotating paddle wheel mounted therein. The main purpose of the paddle wheel with its arms having sealed contact with the air lock chamber is to prevent a substantial undesirable flow of air which would otherwise occur due to the centrifugal fan action of the impeller.

Where very light and highly comminuted material is to be impacted we have found it is desirable to incline the generally radial fling plates 15 forwardly from the radial position to speed up the operation and to further increase to some extent the fling-velocity of such particles. In Figure 6 the dotted lines indicate the adjusted positions of the fling arms for light highly comminuted materials.

With impactors of the type having a continuous internal impaction ring surrounding an impeller, the finer and more sticky particles such as are produced in middlings lodge and accumulate on the ring or in serrations thereon forming cushioning areas which materially lessen the shattering and disintegration of particles impacted. This is entirely avoided with the improved construction of impactor disclosed herein, since the material after shattering must pass between the spaced bars 18.

While our processes have been described in detail and the operations illustrated diagrammatically for the production of comminuted wheat products, including flour, it will be readily apparent to those skilled in the art that the processes and method steps disclosed herein, as well as the apparatus herein described, are as readily applicable to the milling of rye, corn and other grains as well as to the milling of granular food crop products including soy beans, peas, beans and the like.

Where herein and hereafter in the appended claims the terms "granular food crop products" are used, we mean grain products, such as wheat, rye and corn, as well as other more or less granular food products including and of the nature of soy beans, peas and beans.

The term "granular" as applied to products, materials, or stock is used in its broad sense to include whole grains, or integral food crop products as well as particles which have been obtained through disintegrating or dividing whole grain or whole natural crop products.

What we claim is:

1. The process of milling that class of natural granular food products comprising wheat, rye, corn, bean, soybeans and peas, which consists in first centrifugally flinging moisture conditioned granules in natural whole form, at high velocity, against impaction surfaces to shatter the same, disintegrating the friable endosperm portions and breaking away the germ from endosperm and hull, then separating out the germ in substantially whole form and separating out also the larger hull portions containing endosperm particles adhering thereto and thereafter centrifugally fling-impacting said hull portions to loosen and disintegrate the endosperm adhering thereto, collecting the disintegrated endosperm from said impacting operations and reducing and dividing the same by a separate fling-impaction step.

2. In the process of milling that class of natural granular food products comprising wheat, rye, corn, beans, soybeans and peas, the combination of essential steps which consist in centrifugally flinging moisture-conditioned granules in natural, whole form, at high velocity against impaction surfaces to shatter the same, disintegrating the friable endosperm portions and breaking away the germ from endosperm and hull, then separating out the germ in substantially whole form and separating out the disintegrated endosperm substantially free from germ and subsequently subjecting said separated endosperm free of germ and substantially free of hull portions to a succession of high speed, centrifugal impacting operations against hard impact surfaces to successively sub-divide and reduce the size of the substantially pure endosperm particles to flour.

3. The process of milling natural wheat berries which consists in first centrifugally flinging the moisture-conditioned wheat berries in natural whole form, at high velocity against impaction surfaces to shatter the same without producing crushing action and to disintegrate the friable endosperm portions and break away the germ from endosperm and hull, then separating out the germ in substantially whole form and separating out also, endosperm particles substantially free of germ and hull and then subjecting said free endosperm particles to a succession of high speed, centrifugal impaction operations against hard impaction surfaces to successively subdivide and reduce the size of the substantially pure endosperm particles, to flour.

4. The process of milling that class of natural, granular food products comprising wheat, rye, corn, beans, soybeans and peas which consists in first shattering the moisture-conditioned granules in natural whole form, separating out the germ adjacent the head of the mill, separating out the disintegrated endosperm particles substantially free from germ and hull portions and then subjecting said separated endosperm particles to a succession of high speed, centrifugal, fling-impacting operations against hard impact surfaces to successively subdivide, relatively uniformly, and reduce the size of said endosperm particles to flour.

5. In the process of milling wheat, "breaking" steps for shattering and disintegrating the natural berries and for causing the germ to be broken away from endosperm and hull portions which consists in subjecting the moisture-conditioned wheat berries to a succession of high speed, centrifugal, fling-impacting operations against hard impact surfaces, separation steps for removing the broken away wheat germ in substantially whole form and for separating from the material so impacted, the endosperm middlings or grits and middlings reduction steps which consists in subjecting the said middlings or grits to a succession of high speed, centrifugal fling-impacting operations against hard impact surfaces to successively and relatively uniformly, divide and reduce the size of said endosperm or grit particles to flour in a minimum number of operations.

6. In the process of milling that class of natural granular food products comprising wheat, rye, corn, beans, soybeans and peas, the steps for efficient reduction of endosperm particles which consist in subjecting separated endosperm particles substantially free of germ and branny or hull ingredients to a plurality and succession of high speed, centrifugal, fling-impacting operations against hard impact surfaces to successively shatter and subdivide on natural lines of cleavage and substantially uniformly and regularly, the particles to reduce the size thereof to flour in a minimum number of operations.

7. In the process of milling wheat, the steps for efficient reduction of endosperm particles which consist in subjecting separated endosperm particles, subtantially free of germ and branny or hull ingredients to a plurality and succession of high speed, centrifugal, fling-impacting operations against hard impact surfaces to successively subdivide relatively uniformly and regularly, said particles, to flour in a minimum number of operations and wherein the said centrifugal impacting operations are carried out within a critical range of between 3000 and 3600 revolutions per minute.

ROBERT J. S. CARTER.
HUGH McDONALD.

REFERENCES CITED

The following references are of record in the file of this patent:

UNITED STATES PATENTS

| Number | Name | Date |
| --- | --- | --- |
| 253,344 | Chichester | Feb. 7, 1882 |
| 256,073 | Taggart | Apr. 4, 1882 |
| 310,709 | Nagel et al. | Jan. 13, 1885 |
| 1,857,539 | Hadsel | May 10, 1932 |
| 2,236,806 | Sutton et al. | Apr. 1, 1941 |
| 2,377,741 | Andrews et al. | June 5, 1945 |

FOREIGN PATENTS

| Number | Country | Date |
| --- | --- | --- |
| 719,478 | France | Nov. 14, 1931 |
| 20,115 | Great Britain | Jan. 29, 1914 |
| 394,478 | Great Britain | June 29, 1933 |
| 509,524 | Great Britain | July 18, 1939 |